United States Patent [19]

Booman et al.

[11] 3,794,174

[45] Feb. 26, 1974

[54] POROUS METAL INSULATOR SANDWICH MEMBRANE

[75] Inventors: Glenn L. Booman; Joseph R. Delmastro, both of Idaho Falls, Idaho

[73] Assignee: The United States of America as represented by the United States Atomic Energy Commission, Washington, D.C.

[22] Filed: Jan. 11, 1972

[21] Appl. No.: 216,947

[52] U.S. Cl................................ 210/321, 204/180
[51] Int. Cl............................................. B01d 31/00
[58] Field of Search.......... 65/31; 210/321, 500, 23; 204/180 P

[56] References Cited
UNITED STATES PATENTS

| | | | |
|---|---|---|---|
| 3,219,567 | 11/1965 | Lacey | 204/180 P |
| 3,220,941 | 11/1965 | Osborne | 204/180 P X |
| 2,267,752 | 12/1941 | Ruska et al. | 210/500 X |

*Primary Examiner*—Frank A. Spear, Jr.
*Attorney, Agent, or Firm*—John A. Horan; Foster York; Robert James Fisher

[57] ABSTRACT

A membrane for use in reverse osmosis and electrodialysis separation processes comprising a thin metal layer with a thin layer of insulator material on each side thereof, the membrane being porous with the pores having uniform radii from 5 angstroms and lower to approximately 100 angstroms, and means associated with the metal layer for controlling the surface charge density by external electrical circuitry whereby ionic transfer through the pores is controlled. The membrane is made by (a) depositing sequentially by radio-frequency sputtering technique 5-500 angstrom layers of platinum and silicon nitride on a 50-100 micron thick glass substrate to form a thin sandwich. Then (b) there are chemically etched 300 micron diameter holes in the glass substrate by using a mask of sputter-etched molybdenum metal with a thin molybdenum layer functioning as a stopping layer for the etching step. Next (c) the molybdenum masking layer is removed and, using the 300 micron holes in the substrate as a pattern, the molybdenum stopping layer is chemically etched through. Next (d) the resulting sandwich structure is irradiated with fission fragments to produce damage tracks in the $Si_3N_4$ layers, after which these layers are chemically etched along the fission fragment damage tracks. Finally (e) the metal membrane layer is chemically etched through, using the small holes in the surrounding $Si_3N_4$ dielectric layers as a mask.

9 Claims, 5 Drawing Figures

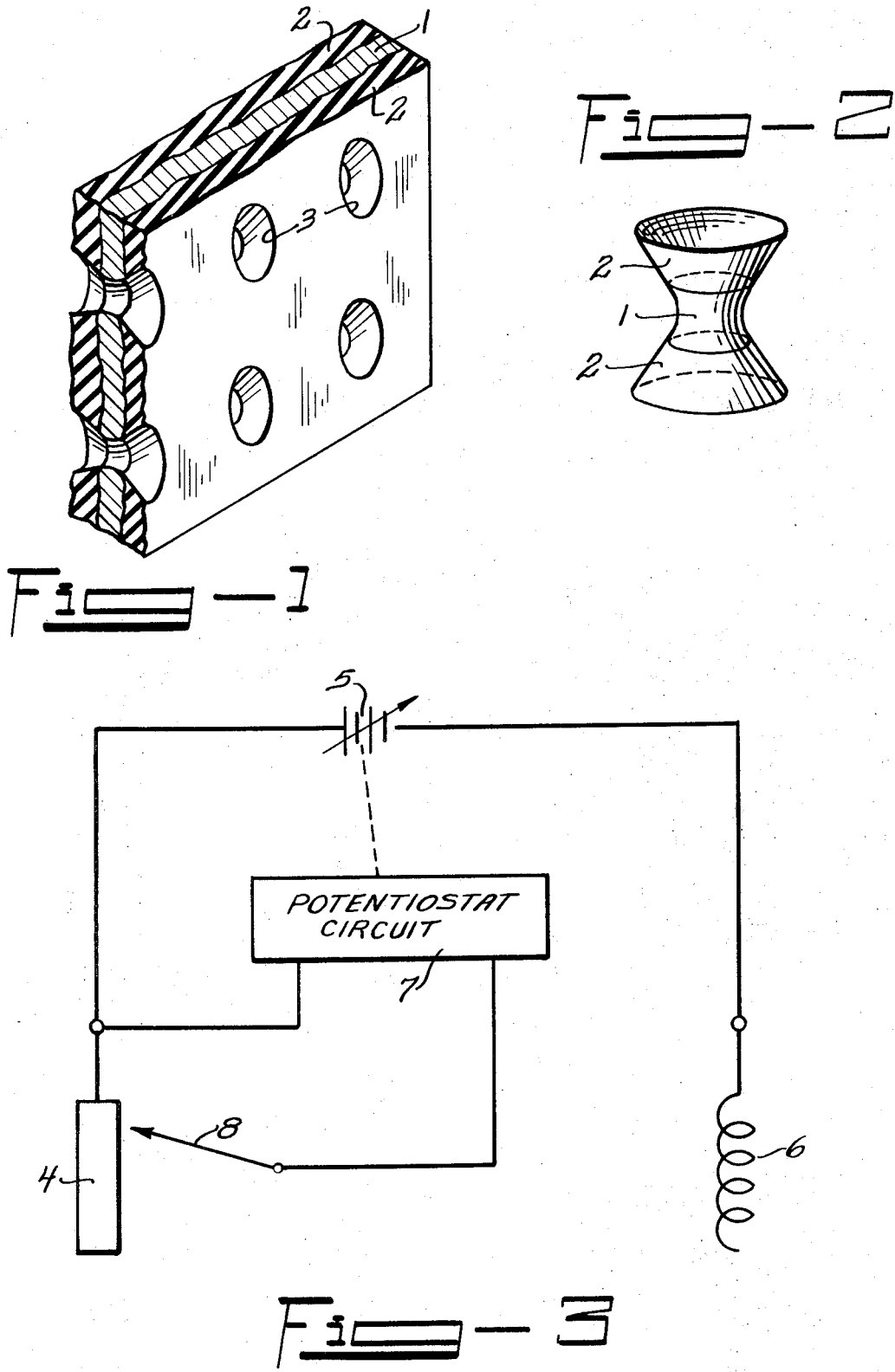

Fig-5

(a) 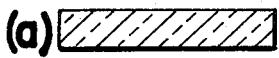
Cleaned glass substrate (50-100 microns thick.)

(b) 
Layers of dielectric and metal R.F. sputtered onto glass substrate.

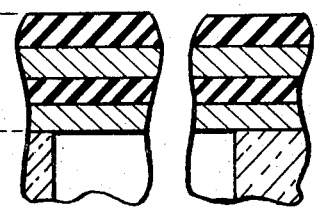

- $Si_3N_4$ (5-500 Å)
- Pt (5-500 Å)
- $Si_3N_4$ (5-500 Å)
- Mo (0.1-1μ) etch-stop layer Glass substrate (c) 
Coated with molybdenum.

(d) 
Molybdenum sputter etched to produce pattern of 100 micron diameter holes.

(e) 
Etched 300 micron holes in substrate through molybdenum mask.

(f) 
Removed molybdenum layers.

(g)  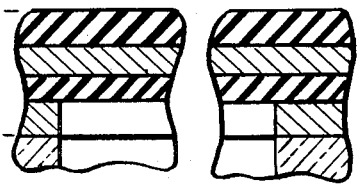
Etched through Mo etch-stop layer. Irradiated thin sandwich structure with fission fragments.

(h)  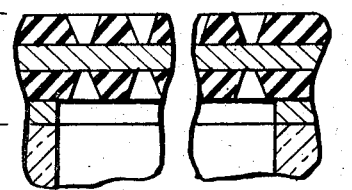
Chemically etched holes in thin $Si_3N_4$ layers along fission fragment damage tracks.

(i)  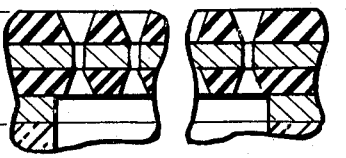
Etched holes through the metal membrane layer.

POROUS METAL INSULATOR SANDWICH MEMBRANE

CONTRACTUAL ORIGIN OF THE INVENTION

The invention described herein was made in the course of, or under, a contract with United States Atomic Energy Commission.

BACKGROUND OF THE INVENTION

The invention relates to porous membranes suitable for use in reverse osmosis and electrodialysis separation processes, and includes processes for making such membranes, and also such membranes having means associated therewith for controlling the surface charge density whereby ionic transfer through the pores of the membrane is controlled.

Salt rejection and selective permeability properties have been attained prior to our invention for charged pore surface of ion exchange membranes. Also, porous glass, such as Vycor, with pore diameters of about 50 angstroms has given separation factors of 5 to 70 per cent with sodium chloride solutions. Cellulose and cellulose ester membranes, for various uses, are known.

The membranes of this invention are of particular value for reverse osmosis and electrodialysis separation processes. They are useful for the products of water and other liquids of low ionic content from water solutions or other liquid sources containing excess ionic components. Also, they may be used for concentration of ionic components for beneficial use. They give improved control over ionic transfer as well as having other advantages over prior art membranes. They have structures with a balance of flow and rejection properties which far exceed those of cellulose acetate and other porous membranes of the prior art known to us.

Other advantages of the membranes of this invention include freedom from compaction, thermal stability, biological inactivity, chemical resistance to high pH and strongly oxidizing conditions, ease of cleaning of fouled membrane surfaces by application of strong chemical agents or by electrochemically controlled desorption and redox cycles, storability in dry form, inexpensive fabrication and handling of large-scale apparatus, optimization of water permeability and salt rejection by control of pore size and charge density of the thin-film metal membrane material.

SUMMARY OF THE INVENTION

The invention in its broad embodiment is a membrane comprising a metal layer with a layer of an insulator material on each side of it, the membrane being porous and having pores of substantially uniform radii of from 5 angstroms and less to approximately 200 angstroms.

The metal layer may be any metal including metal alloys, including gold, silver, gold-silver alloys, platinum, aluminum, nickel, iron and steel.

The insulator material may be any dielectric material, such as glass, silicon dioxide, silicon nitride, polyethylene, polystyrene, phenolformaldehyde resin, cellulose acetate, rubber and the like. Preferably, a highly stable insulating material is used.

Suitably, the insulator or dielectric layers may each be from 5-500A. thick, and the metal layer of the same or of lesser thickness.

For use in reverse osmosis and electrodialysis separation processes, the membrane has associated with the metal layer external electrical circuitry means for controlling the surface charge density whereby ionic transfer through the pores is controlled. Such circuitry is well known in the art.

The membrane should be as thin as possible to give high water transport flux in reverse osmosis applications and to give high single ion fluxes in electrodialysis applications. Thin-film technology allows reproducible preparation of films as thin as a few atomic layers, giving complete experimental control of a very important variable. Theory for salt rejection by electrostatic exclusion from the interior of an uncharged pore has shown independence of membrane thickness.

The insulator or dielectric layer of the membrane has a two-fold purpose in allowing direct external control of pore wall charge effects separate from front surface effects, and in serving as a mask material for etching pores of suitable diameter when making the sandwich metal membrane.

The membrane of this invention may be made in various ways. For example, it may be made by deposition of two-phase systems such as alloys or mixtures, followed by selective chemical or electrochemical etching of one component. Numerous possibilities of this type have been reported in the literature pertaining to gas diffusion membranes (isotopic enrichment of uranium). These techniques can be applied to both the formation of angstrom-size holes in the metal membrane and to the formation of micron-size holes in substrate materials used as a base in making the membranes.

A suitable process of making the membrane comprises a. depositing sequentially layers of metal and dielectric materials on a substrate to form a sandwich, b. forming a plurality of 5-500 micron diameter holes in the substrate, c. chemically etching through the metal stopping layer using the holes in the substrate as a pattern, d. irradiating the resulting sandwich structure with fission fragments to produce damage tracks in the dielectric layers and chemically etching the dielectric layers along the fission fragment damage tracks, and e. chemically etching holes of not more than 200 angstroms diameter through the metal layer using the holes in the surrounding dielectric layers as a mask.

The substrate used in the above process may be glass, plastic, as for example cellulose acetate, phenolformaldehyde resin or any inert material from which the overlying layer may be removed.

BRIEF DESCRIPTION OF THE DRAWINGS

FIG. 1 is an enlarged perspective view of the metal membrane.

FIG. 2 is an idealized representation of a pore in the membrane.

FIG. 3 is a schematic of the electrical circuitry for reverse osmosis applications.

FIG. 5 is a diagrammatical view of a proposed fabrication sequence for the metal membrane.

DETAILED DESCRIPTION OF THE INVENTION

Figure 4:
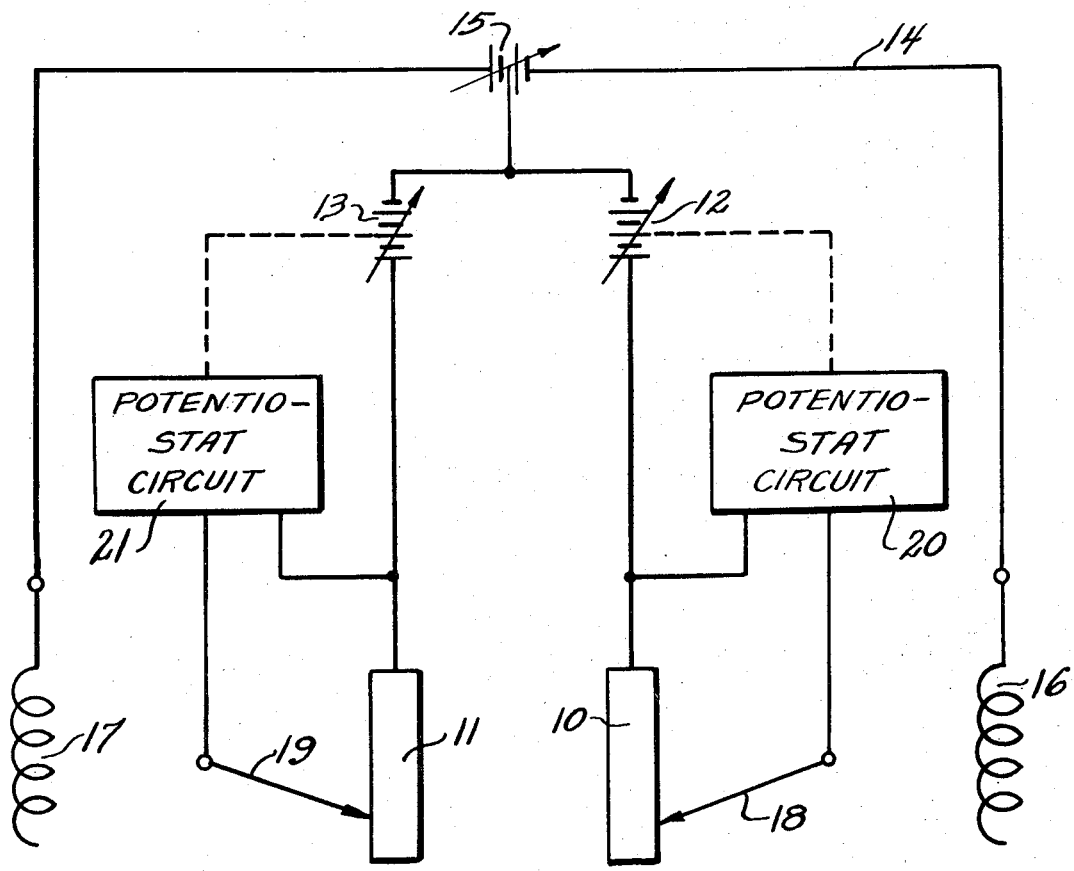
FIG. 4 is a schematic of the electrical circuitry for electrodialysis applications.

A detailed enlarged perspective view of the metal insulator sandwich membrane is shown in FIG. 1 of the accompanying drawing wherein a metal layer 1 of 5–500 angstroms thickness is sandwiched between insulating layers 2, each of 5–500 angstroms thickness, the pores being shown in cross sections as 3.

FIG. 2 shows an idealized representation of a single pore in the metal insulator membrane of FIG. 1 in which insulator surfaces are shown as 2, and the metal layer or electrode surface is shown by 1.

In both reverse osmosis applications and electrodialysis applications, the ionic transfer through the pores of the membrane is controlled by controlling the surface charge density of the membrane by adjusting the applied potential on the membrane with associated external electrical circuitry.

A diagrammatic view of the metal membrane system with electrical control circuitry for reverse osmosis applications is shown in FIG. 3. The metal membrane 4 is mounted in a holder (not shown) permitting electrical connection to the metal membrane 4 but giving isolation from the metal parts of the reverse osmosis equipment (not shown). The electrical circuit is completed by connection of the metal membrane 4 through a direct current voltage source 5 to an auxiliary electrode 6 immersed in the solution to be purified or connected through bridging solutions. The auxiliary electrode 6 can be a metal part of the reverse osmosis equipment, or connected directly to the reverse osmosis equipment, or can be an independent electrode, a preferably of greater surface area by a factor or 10 or more than the area of metal exposed to solution by the metal membrane 4. The voltage source 5 can be of fixed voltage, manually variable, or automatically controlled by a potentiostat circuit indicated at 7 receiving an input signal from a reference electrode 8 positioned adjacent to the metal membrane electrode 4 in the solution. The reference electrode 8 used to measure the metal membrane potential as well as the potentiostat circuit 7 used to measure the voltage between the metal membrane electrode 4 and the reference electrode 8 or to provide automatic control of the voltage through automatic adjustment of the voltage source 5 are optional components.

A diagrammatic view of the metal membrane system with electrical control circuitry for electrodialysis applications is shown in FIG. 4. In a typical electrodialysis application, usually a multiple of two metal membranes 10 and 11 would be connected to separate direct current voltage sources 12 and 13, respectively, to give proper negative or positive potential to the metal membranes 10 and 11. These direct current voltage sources 12 and 13 may be fixed or variable, manually or automatically controlled. The metal membranes 10 and 11 are connected through the direct current voltage sources 12 and 13 to an appropriate return in the main electrodialysis power circuit indicated generally at 14 and the primary direct current voltage source 15. An alternative to the separate direct current voltage sources 12 and 13 is tapping of the primary direct current voltage source 15 directly or with voltage dividers. The main electrodialysis power circuit 14 is complete through the normally installed electrodialysis auxiliary electrodes 16 and 17 immersed in the solution to be purified. One or more reference electrodes 18 and 19 can be employed for measurement or direct potentiostatic control of the surface potential of the metal membranes 10 and 11 through potentiostat circuits indicated at 20 and 21, respectively. The potentiostat circuits 20 and 21 can be used to measure the voltage between the metal membranes 10 and 11 and the reference electrodes 18 and 19 or optionally to provide automatic control of the voltage through automatic adjustment of voltage sources 12 and 13. The reference electrodes 18 and 19 and potentiostat circuits 20 and 21 are optional components.

An electrical circuit for the metal membranes 10 and 11 which is not connected to the main electrodialysis power circuit 14 is also possible.

A detailed disclosure of a suitable method of fabrication of the metal insulator sandwich membrane of this invention is given below:

The most promising methodology is application of the well-developed thin-film techniques involving radio-frequency sputtering in a vacuum system, which etching of holes defined by fission fragment bombardment. Suitable equipment is available for sputter deposition and sputter etching of both metallic and insulating materials. A primary method for fabrication of the porous metallic membranes is summarized in the following table.

METAL MEMBRANE STRUCTURE AND STEPS IN FABRICATION BY THIN-FILM TECHNIQUES

| Layer No. and composition | Layer thickness | Function of layer | Hole diameter | Deposition order | Etch order | Method of forming holes in layer |
|---|---|---|---|---|---|---|
| 5. $Si_3N_4$ | 5–500Å | Insulating | 5–200Å | 4 | 4 | Bombarded simultaneously with layer #3. Fission fragment tracks etched with HF. |
| 4. Pt | 5–500Å | Metal membrane (controlled charge). | 5–200Å | 3 | 5 | Holes chemically etched through pattern in $Si_3N_4$ layers. |
| 3. $Si_3N_4$ | 5–500Å | Insulating | 5–200Å | 2 | 4 | Bombarded simultaneously with layer #5. Fission fragment tracks etched with HF. |
| 2. Mo | 0.1–1μ | Substrate etch stop | 300μ | 1 | 3 | Chemically etched through pattern in glass layer. |
| 1. Glass | 50–100μ | Substrate and support | 300μ | 0 | 2 | Chemically etched with HF through pattern in molybdenum masking layer. |
| 0. Mo | 0.1–1μ | Substrate etch pattern mask. | 100μ | | 5 | 1 | Hole pattern generated by sputter etching through metal mask. |

The method for fabrication of the porous metallic membranes involves the following sequence of steps.

Step A: Deposit sequentially layers (referred to as layers 2–5 in the table) of platinum, molybdenum, and silicon nitride on a 50 to 100 micron thick glass substrate to form a thin sandwich. This procedure forms a metal membrane layer (4) covered on both sides with thin layers of dielectric material (layers 3 and 5).

Step B: Chemically etch 300 micron diameter holes in the supporting substrate (layer 1) by using a mask of sputter-etched molybdenum metal (layer 0) with the second molybdenum layer (2) functioning as a stopping layer for the etching step.

Step C: Remove the molybdenum masking layer and chemically etch through the stopping layer (2) by using the 300 $\mu$ holes in the substrate as a pattern.

Step D: Irradiate the resulting sandwich structure with fission fragments to produce damage tracks in layers 3 and 5, and chemically etch 5 to 200 angstrom or smaller diameter holes in the thin layers of dielectric (layers 3 and 5).

Step E: Chemically etch holes through the metal membrane layer (4) using the small holes in the surrounding dielectric layers (3 and 5) as a mask.

A survey of the literature and suppliers of thin-film equipment indicates that the r.f. sputtering technique is the best available method for depositing uniform alternating thin layers of metals and dielectric materials (Step A).

The results of each step of the proposed fabrication sequence are shown diagrammatically in FIG. 5 of the accompanying drawing.

The embodiments of the invention in which an exclusive property or privilege is claimed are defined as follows:

1. A device with selective permeability properties suitable for use in reverse osmosis and electrodialysis separation processes comprising a porous membrane including a metal layer and a layer of an insulator on each side thereof; and external electrical circuitry means associated with said metal layer for controlling the surface charge density whereby ionic transfer through the pores is controlled.

2. The device of claim 1 wherein said porous membrane has pores of substantially uniform radii of from 5-200 angstroms.

3. A membrane in accordance with claim 2 in which the metal layer is platinum of 5-500 angstroms thickness.

4. A membrane in accordance with claim 3 in which the insulator layers are layers of silicon nitride each of 5-500 angstroms thickness.

5. A process of making a membrane suitable for use in reverse osmosis and electrodialysis separation processes which comprises a. depositing sequentially layers of metal and dielectric materials on a substrate to form a sandwich, b. forming a plurality of 5-500 micron diameter holes in the substrate, c. chemically etching through the metal layer using the holes in the substrate as a pattern, d. irradiating the resulting sandwich structure with fission fragments to produce damage tracks in the dielectric layers and chemically etching the dielectric layers along the fission fragment damage tracks, and e. chemically etching holes of not more than 200 angstroms diameter through the metal layer using the holes in the surrounding dielectric layers as a mask.

6. A process in accordance with claim 5 in which the layer of metal in (a) in platinum, the dielectric layer is silicon nitride, the substrate is glass, and the holes of (b) are formed by chemically etching and are of approximately 300 microns diameter.

7. A process in accordance with claim 6 in which the layers of (a) are deposited in alternate layers of 5-500 angstroms thickness on a 50-100 micron thick substrate by radio-frequency sputtering in a vacuum system.

8. In a system for obtaining a liquid of low ionic content from a liquid source containing excess ionic components which includes a porous membrane and means to effect a reverse osmosis separation through the membrane, the improvement therein, wherein said porous membrane comprises a metal layer having a layer of an insulator on each side thereof, said porous membrane having pores of substantially uniform radii of from 5-200 angstroms, said metal layer having associated therewith external electrical circuitry means for controlling the surface charge density of said membrane whereby ionic transfer through the pores is controlled.

9. In a system for obtaining a liquid of low ionic content from a liquid source containing excess ionic components which includes a series of paired porous membranes and means to effect an electrodialysis separation through the membranes, the improvement therein, wherein said porous membranes each comprise a metal layer having a layer of an insulator on each side thereof, said porous membranes having pores of substantially uniform radii of from 5-200 angstroms, said metal layer of each membrane having associated therewith external electrical circuitry means for controlling the surface charge density of said membrane whereby ionic transfer through the pores is controlled.

* * * * *